(No Model.)

W. H. & A. J. BAILEY.
OIL CUP.

No. 478,977. Patented July 19, 1892.

Witnesses:
J. B. Bolton
H. Palmer

Inventors:
William Henry Bailey
Alfred John Bailey
By Rerardo
their Attorneys.

UNITED STATES PATENT OFFICE.

WILLIAM H. BAILEY AND ALFRED J. BAILEY, OF SALFORD, ENGLAND.

OIL-CUP.

SPECIFICATION forming part of Letters Patent No. 478,977, dated July 19, 1892.

Application filed April 4, 1892. Serial No. 427,703. (No model.) Patented in England February 27, 1891, No. 3,564.

*To all whom it may concern:*

Be it known that we, WILLIAM HENRY BAILEY and ALFRED JOHN BAILEY, subjects of the Queen of Great Britain, residing at Salford, in the county of Lancaster, England, have invented certain new and useful Improvements in Valves for Lubricators and the Like, (for which we have obtained Letters Patent in Great Britain, numbered 3,564, and bearing date February 27, 1891,) of which the following is a specification.

Our invention relates to valves for lubricators and the like; and it consists in the application of a simple device for regulating the amount of the lubricant or fluid allowed to be delivered from the cup or reservoir.

In carrying out our invention we pivot eccentrically above or outside the oil-cup or valve-casing a disk upon the valve stem or spindle, and we fix a pin upon the said stem or spindle or otherwise arrange so as to limit the extent of its movement longitudinally. The weight of the stem or spindle, or it may be a spring, always tends to close the valve; but by moving round the disk upon its pivot the valve can be opened to its fullest extent or set to any intermediate point, so as to deliver any required amount of lubricant or fluid. We prefer to graduate the disk, say, from "0" to "4" or any other convenient number in order to indicate at a glance the position of the valve; and in order that our invention may be fully understood and readily carried into effect we will describe the accompanying sheet of drawings, reference being had to the figures and letters marked thereon.

Figure 1:
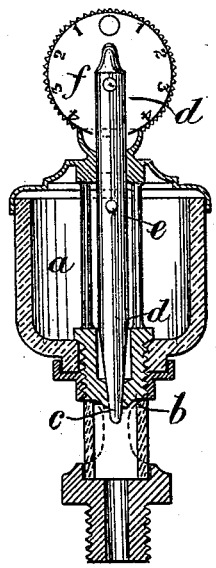
Figure 2:
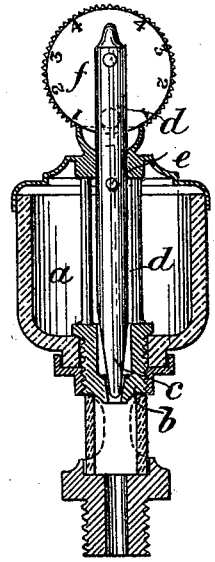

Figure 1 is a sectional elevation of a lubricator, to the valve of which our improvements have been applied; and Fig. 2 is a similar view, but showing the valve in a different position.

In the views, $a$ designates the oil cup or reservoir; $b$, the valve-seating; $c$, the valve; $d$, the valve-spindle; $e$, the stop thereon to limit the lift, and $f$ the graduated disk, which is pivoted eccentrically to the valve-spindle $d$.

In Fig. 1 the valve is shown closed, the spindle $d$ pointing to zero on the disk $f$, and when in this position no oil or other lubricant can flow from the cup or reservoir $a$ past the valve $c$.

In Fig. 2 the valve is shown open to its fullest extent as limited by the stop $e$, and consequently the maximum quantity of lubricant can flow from the cup or reservoir $a$ past the valve $c$.

By adjusting the disk $f$ to either of the intermediate points (marked 1 2 3 4, respectively) the flow of lubricant can be further regulated.

Having now particularly described and ascertained the nature of our said invention and in what manner the same is to be performed, we declare that what we claim, and desire to secure by Letters Patent of the United States, is—

1. In combination with a lubricator, a valve controlling the outlet thereof and a disk eccentrically pivoted to the stem of the valve and having a suitable bearing for its periphery, substantially as described.

2. In combination with the cup $a$, the valve, and stem $d$, passing through the cup, a disk pivoted eccentrically to the upper end thereof and bearing on the upper part of the cup, substantially as described.

In witness whereof we have hereunto set our hands in presence of two witnesses.

W. H. BAILEY.
ALFRED J. BAILEY.

Witnesses:
S. W. GILLETT,
HERBERT R. ABBEY.